Jan. 7, 1947.  B. L. KINYON  2,414,044
SEDIMENT TESTING DEVICE
Filed March 10, 1945  2 Sheets-Sheet 1

Inventor
Bernard L. Kinyon,
Attorney

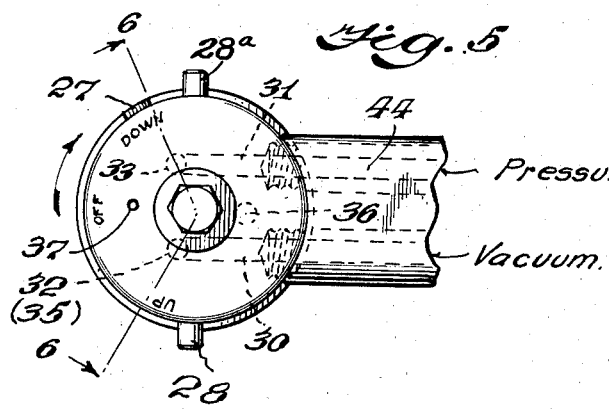
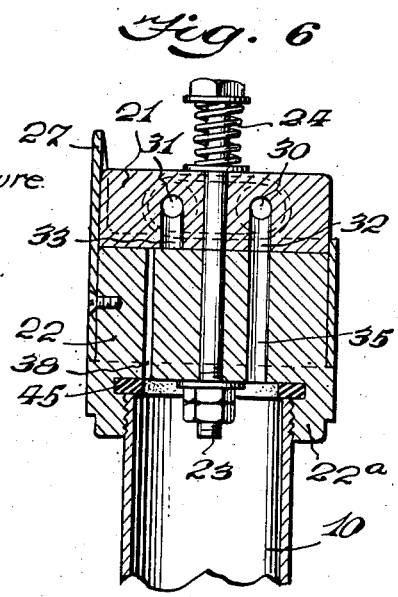
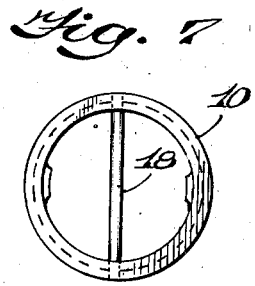
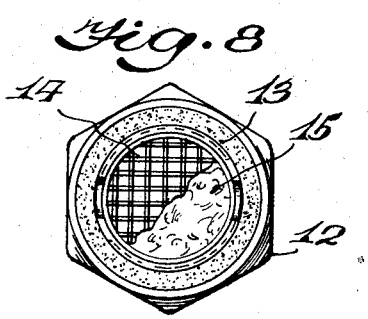
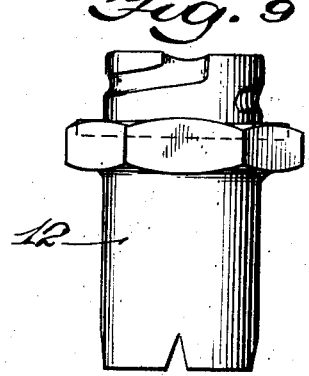

Patented Jan. 7, 1947

2,414,044

UNITED STATES PATENT OFFICE 2,414,044

SEDIMENT TESTING DEVICE

Bernard L. Kinyon, Richland Center, Wis.

Application March 10, 1945, Serial No. 582,145

11 Claims. (Cl. 73—61)

This invention relates to improvements in testing devices of the type employed to test the sediment content of milk and like liquids, and is more particularly directed to the provision of a power operated sediment tester of the portable type incorporating a power head unit which is moreover applicable to converting existing hand operated sediment testers to power operation without impairing the desirable portable features thereof.

According to standard dairy practice, the various batches of milk being processed are sampled and the samples tested for sediment or foreign matter content. Although suggestion has been made heretofore of providing power operated sediment testers, these usually have been of the fixed or laboratory type not suitable or practical for the smaller dairy or creamery, with the result that this type of device has never attained any wide commercial usage. On the other hand, dairies and creameries have in general relied on portable hand operated sediment testers which can be carried about from place to place and inserted in milk cans and like milk holding vessels as required, thus to obtain samples of the contents thereof for testing. The disadvantages of the standard hand operated tester is that it requires considerable strength to operate and, in a creamery requiring several hundred tests, for example, it is beyond the strength of the average man to make them. Moreover, a test conducted by the hand operated tester is relatively time-consuming, so that when a number of tests are required to be run, the cost thereof in terms of man hours is substantial.

The present invention has for its principal object the provision of a simple and practical milk sediment tester in which the advantages of the standard portable testers of the hand operated type are retained but which overcomes the disadvantages of such devices in the provision of power means for their operation, thus to relieve the operator of the heavy labor incident to hand operation, while at the same time substantially reducing the time required to run one or a series of such tests. In its more specific aspects, the invention contemplates and provides a pneumatic power head which can be coupled in a simple operation to the barrel of a standard portable milk tester in place of the usual barrel head or cap and which when connected to a source of compressed air and vacuum, for example a compressor with which substantially all dairies and creameries are equipped for cleaning various devices and for operating air valves and the like, provides for the power operation of the tester plunger during both its sample drawing and discharging strokes. Among the more detailed objects of the invention may be noted the provision of a practical, easily operated and self-contained pneumatic power head for operating milk sediment testers.

Other objects will be in part obvious and in part hereinafter pointed out in connection with the following analysis of the invention wherein a preferred embodiment of the invention is illustrated.

In the drawings—

Fig. 5 is a view similar to Fig. 2, illustrating relative positioning of power head ports in the "up" position of the valve member;

Fig. 6 is a section taken along line 6—6 of Fig. 5, the view further illustrating interior barrel and foot construction of the tester as a whole; and Figs. 7, 8 and 9 are detail views illustrating detailed constructions of the barrel and foot as shown in Fig. 6.

Figure 1:
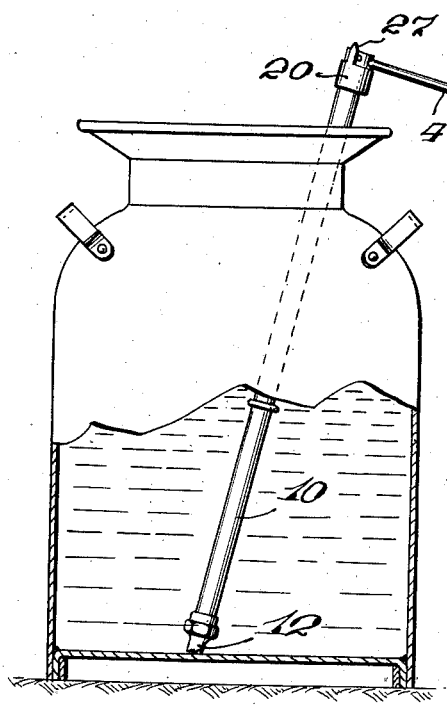
Fig. 1 is a side elevation in partial section of a power operated milk sediment tester according to the invention, the tester being shown as inserted in a milk containing vessel in position to obtain a sample of the contents thereof.

As is well known, portable sediment testers of the standard hand operated type usually comprise a sampling barrel into which a measured quantity of milk to be tested is drawn by a piston or plunger on its up or suction stroke, the sample being thereupon forcibly expelled from the barrel on the down or pressure stroke of the plunger through a filter pad of suitable filtering material usually positioned adjacent the foot or discharge end of the barrel, the pad entraining any sediment or foreign matter contained in the sample and thus providing a basis of determining the amount of sediment or foreign matter contained in the milk under test. One form of a commercial tester as outlined is generally illustrated in the drawings, wherein 10 indicates a cylindrical sampling barrel within which a plunger 11 (Fig. 6) is mounted for reciprocation. The barrel carries at its lower end a detachable foot 12 (Fig. 9) which, in the typical device illustrated, is adapted to be coupled to and uncoupled from the barrel by means of a bayonet joint connection. The foot is formed with an annular thickness providing space for the reception of a sealing gasket 13 (Fig. 8) which seals the joint between the foot and lower end of the barrel when the former is coupled on to the barrel. The foot is of tubular construction to form in effect a continuation of the barrel and at its upper end has affixed thereto a filter pad support 14 which consists of a circular screen of coarse mesh offering no substantial obstruction to the flow of milk into the barrel, the screen being set beneath the top circular edge of the foot to provide a circular seat or recess for a disc-like filter pad 15. In the commercial device illustrated, the barrel adjacent its lower end is provided with a cross wire 18 which is spaced from the bottom edge thereof a distance such that, upon coupling the foot with a filter pad seated in the recess provided therefor, the cross wire engages against the upper face of the pad along a diameter thereof. Hence, as milk is drawn into the barrel on the up stroke of the plunger, the filter pad 15 folds or bends on itself along the line of contact of the cross wire 18 with the pad, with the result that the milk drawn into the barrel effectively flows around the pad. However, as the milk is expelled or discharged from the barrel by movement of the plunger on its pressure stroke, the pad assumes a flat position against its screen-like support 14, with the milk accordingly flowing through the pad which entrains any sediment or foreign matter contained in the sample.

In the standard hand operated tester, the upper end of the barrel is closed by a head cap through which extends a plunger actuating rod affixed at its inner end to the plunger and carrying at its outer end a handle which is grasped by the operator in the manual operation of the device. According to the present invention, the head cap, together with the plunger actuating rod and its handle characterizing the standard portable tester, is dispensed with, and a power head for actuating the plunger is provided in place thereof.

Figure 3:
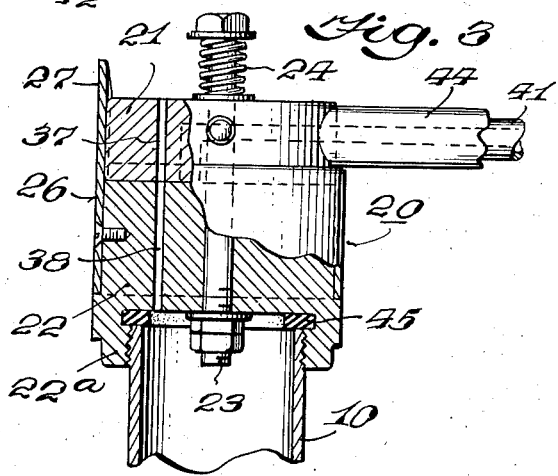
Fig. 3 is a part section through the power head and tester barrel, illustrating the arrangement of power head body and valve parts in the "off" position of the tester.

To this end, the invention provides a pneumatic power head generally designated 20, which is connected to a source of compressed air and vacuum and which is adapted to be coupled directly to the upper end of the barrel 10 in place of the conventional head cap. As shown in Figs. 3 and 6, the power head 20 consists of two principal and coaxially related parts, namely, a cylindrical body member 21 and a rotary valve plug or member 22. The body and rotary members, which are formed with substantially equal diameters, are connected in face engagement by means of a through bolt 23, on the axis of which the valve member may be turned relative to the body member, an outer spring 24 carried by the bolt 23 insuring tight face engagement between said head parts at all times. Carried by the rotary valve member is an outer sleeve 26, the upper edge of which extends above the plane of contact between the body and valve members so as to prevent entry of dust or dirt therebetween, the sleeve moreover carrying an index or pointer 27 extending upwardly along the outer cylindrical face of the body member. The latter is provided with stop pins 28, 28a disposed on a transverse diameter of the body member to project outwardly from the circumference thereof. The aforesaid stop pins function in conjunction with pointer 27 to limit rotation of the sleeve 26 and hence of the valve member 22 to an arc of approximately 150°.

Figure 2:
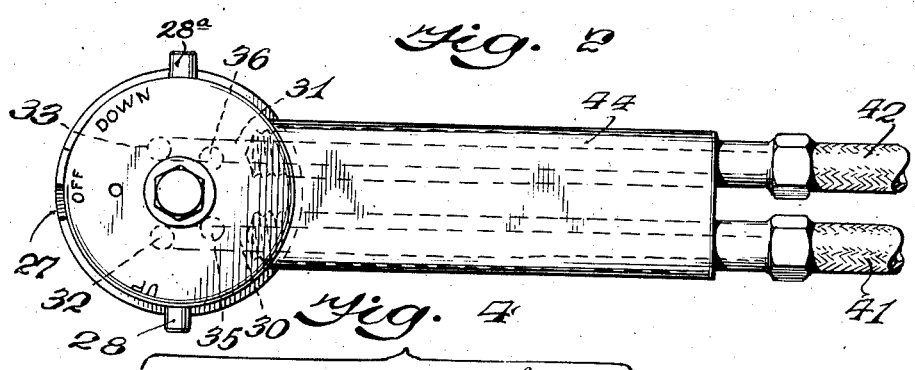
Fig. 2 is a top view of the tester shown in Fig. 1 and its air connections, the view further illustrating relative positioning of power head ports in the "off" position.

By reference to Figs. 2 and 5, the body member 21 of the head is formed with two longitudinal passages 30, 31 of equal length which extend in parallel relation and are disposed symmetrically to the sides of a longitudinal diameter thereof. The passages, which open through the cylindrical surface of the body member at their outer ends, terminate at their inner ends in axially extending ports 32, 33, respectively, which by reference to Figs. 4 and 6 open through the relatively under face of the body member, i. e. the face in contact with the valve member 22. It will be observed that ports 32, 33 are disposed on an arc of constant radius from the center of the body member and are spaced from each other by an angle of approximately 150°.

Figure 4:
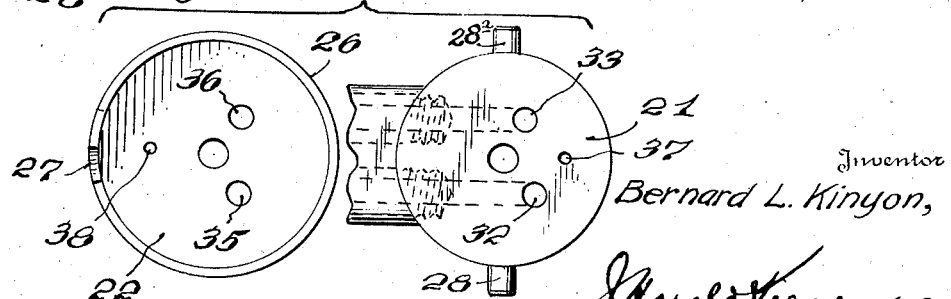
Fig. 4 is a separated view of the power head body and valve members, the body member being in inverted position.

As seen in Figs. 2 and 4, the rotary valve member 22 is provided with two through ports 35, 36 which are spaced on an arc of approximately 300° and are disposed on a radius from the common axis of the body and valve members which is equal to the radius of the arc on which the ports 32, 33 of the body member 21 are disposed. The body and valve members are provided with vent ports 37, 38, respectively, which are adapted to register when the valve member is moved to an intermediate position, as determined by the stop pins 28, 28a.

In the above described arrangement, rotation of the valve member 22 about the axis of bolt 23 is employed to effect registry of body and valve member ports 32, 35, respectively, or of the body and valve member ports 33, 36, respectively. Hence, by connecting passages, 30, 31 of the body member with a source of vacuum and a source of air pressure, respectively, rotation of the valve member results alternately in a vacuum or pressure condition obtaining within the barrel 10 of a tester to which the head is coupled, and a corresponding reciprocation of the plunger 11.

In the illustrated arrangement, the valve body passage 30 is connected by a tube 41 with a source of vacuum, for example a vacuum tank connected to the suction side of a compressor, and valve body passage 31 is connected by a tube 42 with a source of air pressure, for example an air tank or reservoir connected to the discharge side of the aforesaid compressor. Thus, when it is desired to obtain a sample of milk contained in a vessel such as the milk can shown in Fig. 1, for example, for the purpose of testing for the sediment content thereof, the tester provided with a power head as described is inserted into the can to a depth permitting the foot 12 to rest on the floor or bottom of the can, and the valve member 22 is rotated clockwise from its "off" position (Figs. 2 and 3) and relative to the body member of the head until index 27 engages against stop pin 28a, the angular throw of the valve member being predetermined (approximately 75°) so that the aforesaid rotation brings valve port 35, which functions as a vacuum port, into registry with the vacuum port 32 of the body member, as shown in Figs. 5 and 6. The interior of the barrel is thereupon subjected to the suction pressure obtaining at the inlet side of the compressor or in the vacuum tank, it being understood that the compressed air ports 33, 36, and also the vent ports 37, 38 are out of registry. Accordingly, plunger 11 is actuated throughout its suction stroke and a sample of milk is drawn into the barrel through the tubular foot 12, the milk flowing past or around the filter pad 15 during plunger actuation. To discharge the milk from the barrel, the valve is turned in counter-clockwise direction until the index 27 engages against the stop pin 28, the angular throw of the valve being approximately 150° and being such as to bring the valve pressure port 36 into registry with the pressure port 33 of the body member and to move ports 32, 35 out of registry. Accordingly, air pressure is admitted behind the plunger and the latter is forced on its down stroke, during which it effects discharge of milk from the barrel. As the plunger pad resumes its flat position during such discharge, it functions to entrain any sediment or foreign matter contained in the sample.

The rotary disc may now be turned in clockwise direction to its intermediate or "off" position, in which all pressure and vacuum ports are out of registry but in which vent ports 37 and 38 register to release pressure within the barrel. The tester is now raised from the milk can and the foot 12 is thereupon uncoupled from the lower end of the barrel, permitting removal of the filter pad from its seat for examination and determination of the sediment or foreign matter content of the sample. Upon inserting a new plunger pad and re-coupling the foot 12 to the barrel 10, the device is conditioned for sampling another batch of milk, the cycle being initiated by moving the valve clockwise until pointer 27 engages stop pin 28a.

For convenience of the operator, the upper face of the body member 21 may contain suitable markings such as "Up," "Off" and "Down," whereby to advise the operator of the direction in which the rotary valve must be turned to effect one or the other strokes of the plunger.

To assist in handling the tester as described, the tubes 41, 42 adjacent the head are enclosed within a metallic sheath 44 common to both of the tubes and which is preferably shaped to provide a hand grip by which the testing device may be lowered into a milk can, for example, until the foot 12 engages against the bottom thereof and thereafter may be lifted from the can and moved from place to place. It will be understood, also, that the tubes 41 and 42 extending to the compressor will be of flexible construction for at least a portion of their length whereby the device including the power head substantially retains the desirable portable features of the sediment testers of standard construction which are operated by hand.

In a sampler equipped with a power head as described, and using from 20 to 25 inches of vacuum and 45 to 60 pounds of air pressure, sediment tests were taken in four seconds or less, and with the operator being under no requirement for manually actuating the plunger on its "up" and "down" strokes, the actuation of the plunger being instead effected pneumatically and with the operator being required only to actuate the valve member through its cycle of movement from "off" to "up" to "down" to "off" positions. From the above, the self-contained construction and operation of a power head according to the invention will be self-evident.

While milk sediment testers may be equipped with fixed power heads of the character described, it is desirable that the power head may be made as a separate unit capable of being screwed on to and from the tester barrel, whereby the latter may be readily cleaned. To this end, the head valve member illustrated is formed with an axially extending flange 22a which is interiorly threaded to receive the threaded upper end of the barrel. The flange 22a is preferably provided with a gasket recess for receiving a gasket 45 against which the upper edge of the barrel seats as the latter is screwed into the head, thus to form an air-tight joint between head and barrel. A separate power head is also of advantage, because it may be employed in converting existing sediment testers of the standard hand operated type to power operation merely by removing the barrel cap and disconnecting the plunger operating rod from the plunger, and thereupon coupling the head to the upper end of the barrel in place of the barrel cap.

As many changes could be made in carrying out the above construction without departing from the scope of the invention, it is intended that all matter contained in the above description or shown in the accompanying drawings shall be interpreted as illustrative and not in a limiting sense.

I claim:

1. A power-operated sediment tester of the portable type, comprising the combination of a sampling barrel having filter means at its foot end, a reciprocable plunger disposed within the barrel adapted on its suction stroke to draw a measured quantity of liquid to be tested into the barrel and on its pressure stroke to discharge the liquid from the barrel through the filter means, and means coupled to the head end of the barrel providing a head closure therefor and being connected to sources of vacuum and compressed air for effecting pneumatic actuation of the plunger on its suction and pressure strokes.

2. A power-operated sediment tester of the portable type, comprising the combination of a sampling barrel having filter means at its foot end, a reciprocable plunger disposed within the barrel adapted on its suction stroke to draw a measured quantity of liquid to be tested into the barrel and on its pressure stroke to discharge the liquid from the barrel through the filter means, means coupled to the head end of the barrel providing a head closure therefor and being connected to sources of vacuum and compressed air, and manual means operative alternately to establish communication between the interior of said barrel and said sources through said last means, whereby to effect power actuation of the plunger on its suction and pressure strokes.

3. A power-operated sediment tester of the portable type, comprising the combination of a sampling barrel having filter means at its foot end, a reciprocable plunger disposed within the barrel adapted on its suction stroke to draw a measured quantity of liquid to be tested into the barrel and on its pressure stroke to discharge the liquid from the barrel through the filter means, and a power head mounted on the head end of the barrel and being connected to sources of vacuum and compressed air, said head incorporating means operative alternately to connect the interior of the barrel to said sources thereby to effect power actuation of the plunger on its suction and pressure strokes.

4. A power-operated sediment tester of the portable type, comprising the combination of a sampling barrel having filter means at its foot end, a reciprocable plunger disposed within the barrel adapted on its suction stroke to draw a measured quantity of liquid to be tested into the barrel and on its pressure stroke to discharge the liquid from the barrel through the filter means, and a power head coupled to the head end of the barrel including members mounted for relative movement, one of said members being connected to sources of vacuum and compressed air and the other member being operative upon relative movement between said members alternately to establish communication through said one member between the interior of the barrel and said sources thereby to effect power operation of the plunger.

5. A power-operated sediment tester of the portable type, comprising the combination of a sampling barrel having filter means at its foot end, a reciprocable plunger disposed within the barrel adapted on its suction stroke to draw a measured quantity of liquid to be tested into the barrel and on its pressure stroke to discharge the liquid from the barrel through the filter means, and a power head mounted on the head end of the barrel including relatively rotatable body and valve members, the body member having passages extending to sources of vacuum and compressed air, and the valve member having ports adapted upon predetermined relative rotation aforesaid alternately to establish communication between the interior of the barrel and said passages, whereby to effect power actuation of the plunger.

6. A pneumatic power head adapted to be coupled to the head end of the sampling barrel of a portable-type sediment tester for effecting power operation of a plunger reciprocable in said barrel, comprising relatively rotatable body and valve members, the body member having passages adapted to be connected to sources of vacuum and air pressure, respectively, and terminating in vacuum and pressure ports, the valve member having vacuum and pressure ports adapted upon predetermined relative rotation of the body and valve members in opposite direction to register with the corresponding ports of the body member, one of said members including means for detachably coupling the power head to the head end of the sampling barrel.

7. A pneumatic power head adapted to be coupled to the head end of the sampling barrel of a portable-type sediment tester for effecting power operation of a plunger reciprocable in said barrel, comprising relatively rotatable body and valve members, the body member having passages adapted to be connected to sources of vacuum and air pressure, respectively, and terminating in vacuum and pressure ports, the valve member having vacuum and pressure ports adapted upon predetermined relative rotation of the body and valve members in opposite direction to register with the corresponding ports of the body member, the valve member carrying means for detachably coupling the power head to the head end of the sampling barrel.

8. A pneumatic power head adapted to be coupled to the head end of the sampling barrel of a portable-type sediment tester for effecting power operation of a plunger reciprocable in said barrel, comprising coaxial body and valve members, means mounting the valve member for rotation about the common axis relative to the body member and providing for tight face contact between said members, said body member having passages adapted to be connected to sources of vacuum and air pressure, respectively, and terminating in vacuum and pressure ports opening through the face thereof in contact with the valve member, the valve member having vacuum and pressure ports extending from face to face thereof, the valve member vacuum port upon predetermined rotation of the valve member in one direction registering with the body member vacuum port, and the valve member pressure port upon predetermined rotation of the valve member in the opposite direction registering with the body member vacuum port.

9. A pneumatic power head as set forth in claim 8, wherein the valve member is provided with means for detachably coupling the head to the head end of the sampling barrel.

10. A pneumatic power head as set forth in claim 8, wherein the body and valve members are provided with cooperating means for limiting the rotation of the valve member in both directions to that required to bring the body and valve member ports into registering relation.

11. A pneumatic power head adapted to be coupled to the head end of the sampling barrel of a portable-type sediment tester for effecting power operation of a plunger reciprocable in said barrel, comprising coaxial body and valve members, means mounting the valve member for rotation about the common axis relative to the body member and providing for tight face contact between said members, said body member having passages adapted to be connected to sources of vacuum and air pressure, respectively, and terminating in vacuum and pressure ports opening through the face thereof in contact with the valve member, the valve member having vacuum and pressure ports extending from face to face thereof, the body and valve member ports being disposed on arcs of equal radius from the common axis and the angular relation of said ports being such as to require predetermined rotation of the valve member in opposite directions to bring its vacuum and pressure ports into registry with the corresponding ports of the body member.

BERNARD L. KINYON.